United States Patent
Yamasaki et al.

(10) Patent No.: US 9,444,958 B2
(45) Date of Patent: Sep. 13, 2016

(54) IMAGE READING DEVICE AND IMAGE FORMING APPARATUS INCLUDING THE SAME

(71) Applicant: KYOCERA Document Solutions Inc., Osaka (JP)

(72) Inventors: Shunsuke Yamasaki, Osaka (JP); Yoshiyuki Asakawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/831,162

(22) Filed: Aug. 20, 2015

(65) Prior Publication Data
US 2016/0065768 A1    Mar. 3, 2016

(30) Foreign Application Priority Data

Aug. 29, 2014   (JP) ................................ 2014-174812

(51) Int. Cl.
| | | |
|---|---|---|
| H04N 1/04 | (2006.01) | |
| H04N 1/00 | (2006.01) | |
| H04N 1/028 | (2006.01) | |

(52) U.S. Cl.
CPC ...... *H04N 1/00557* (2013.01); *H04N 1/00543* (2013.01); *H04N 1/00559* (2013.01); *H04N 1/00798* (2013.01); *H04N 1/02895* (2013.01)

(58) Field of Classification Search
CPC ................. H04N 2201/0094; H04N 1/00559; H04N 1/00368; H04N 1/00535; H04N 1/00588; H04N 1/00602; H04N 1/00774; H04N 2201/0081; H04N 2201/0418
USPC ....... 358/474, 296, 497, 498, 1.5, 3.32, 401, 358/486; 271/10.16, 114, 14, 195, 4.01, 65; 399/140, 191, 199, 207, 208, 209, 260, 399/305, 377
See application file for complete search history.

(56) References Cited

U.S. PATENT DOCUMENTS

| | | | | |
|---|---|---|---|---|
| 4,779,141 A | * | 10/1988 | Watanabe | H04N 1/1017 347/263 |
| 6,101,003 A | * | 8/2000 | Wu | H04N 1/1017 358/474 |
| 7,894,106 B2 | * | 2/2011 | Fujioka | H04N 1/1013 358/400 |
| 8,213,062 B2 | * | 7/2012 | Ozawa | H04N 1/024 250/208.1 |
| 8,773,735 B2 | * | 7/2014 | Ozawa | H04N 1/1017 358/474 |

(Continued)

FOREIGN PATENT DOCUMENTS

JP    2003-233139    8/2003

*Primary Examiner* — Negussie Worku
(74) *Attorney, Agent, or Firm* — Wenderoth, Lind & Ponack, L.L.P.

(57) ABSTRACT

An image reading device includes a light source arranged below a document table glass and irradiating light to a document on the document table glass, a carriage that holds the light source and is movable in a sub-scanning direction perpendicular to a main scanning direction, a photoelectric conversion unit that receives the light irradiated by the light source and reflected from the document, a pair of rail members that extend in the sub-scanning direction while being arranged spaced apart from each other in the main scanning direction and support the carriage so as to be movable in the sub-scanning direction, a rotatable shaft, and an eccentric cam that is fixed to the shaft, has a peripheral surface abutting at least one predetermined place of the pair of rail members, and rotates together with the shaft to displace the predetermined place of the rail members in a vertical direction.

6 Claims, 9 Drawing Sheets

(56) References Cited

U.S. PATENT DOCUMENTS

| | | | | |
|---|---|---|---|---|
| 2007/0047025 A1* | 3/2007 | Fujioka | ............... | H04N 1/1013 358/474 |
| 2010/0091334 A1* | 4/2010 | Qiao | ................. | G03G 15/5062 358/3.26 |
| 2013/0003143 A1* | 1/2013 | Yamasaki | ........... | H04N 1/1013 358/475 |
| 2014/0376067 A1* | 12/2014 | Yamasaki | ............ | H04N 1/1039 358/497 |
| 2015/0341519 A1* | 11/2015 | Yamasaki | ............ | H04N 1/0249 358/497 |
| 2016/0165418 A1* | 6/2016 | Gosselin | ........... | H04M 1/72552 455/414.3 |

\* cited by examiner

IMAGE READING DEVICE AND IMAGE FORMING APPARATUS INCLUDING THE SAME

CROSS-REFERENCE TO RELATED APPLICATION

This application is based upon and claims the benefit of priority from Japanese Patent Application No. 2014-174812 filed on Aug. 29, 2014, the entire contents of which are incorporated herein by reference.

BACKGROUND

The technology of the present disclosure relates to an image reading device and an image forming apparatus including the same.

Conventionally, as an image reading device mounted in an image forming apparatus such as a copy machine, there has been known a device in which light is irradiated from a line-shaped light source to a document placed on a document table glass and a photoelectric conversion unit receives reflected light from the document via a mirror. The image reading device, for example, has one light source and three mirrors (first to third mirrors). The light source and the first mirror are held by a first carriage and the second and third mirrors are held by a second carriage. The first and second carriages are supported by a pair of rail members arranged spaced apart from each other in a main scanning direction so as to be movable in a sub-scanning direction (a direction perpendicular to the main scanning direction). At the time of image reading, the first and second carriages are respectively driven by a driving mechanism at a predetermined speed in the sub-scanning direction.

SUMMARY

An image reading device according to one aspect of the present disclosure includes a light source, a carriage, a photoelectric conversion unit, a pair of rail members, a shaft, and an eccentric cam. The light source is arranged below a document table glass and irradiates light to a document on the document table glass. The carriage holds the light source and is movable in a sub-scanning direction perpendicular to a main scanning direction. The photoelectric conversion unit receives the light irradiated by the light source and reflected from the document and converts the received light into an electrical signal. The pair of rail members extend in the sub-scanning direction and are arranged spaced apart from each other in the main scanning direction. The pair of rail members support the carriage so as to be movable in the sub-scanning direction. The shaft is rotatable. The eccentric cam is fixed to the shaft. The eccentric cam has a peripheral surface abutting at least one predetermined place of the pair of rail members, and rotates together with the shaft to displace the predetermined place of the rail members in a vertical direction.

DETAILED DESCRIPTION

<<Embodiment>>

Figure 1:
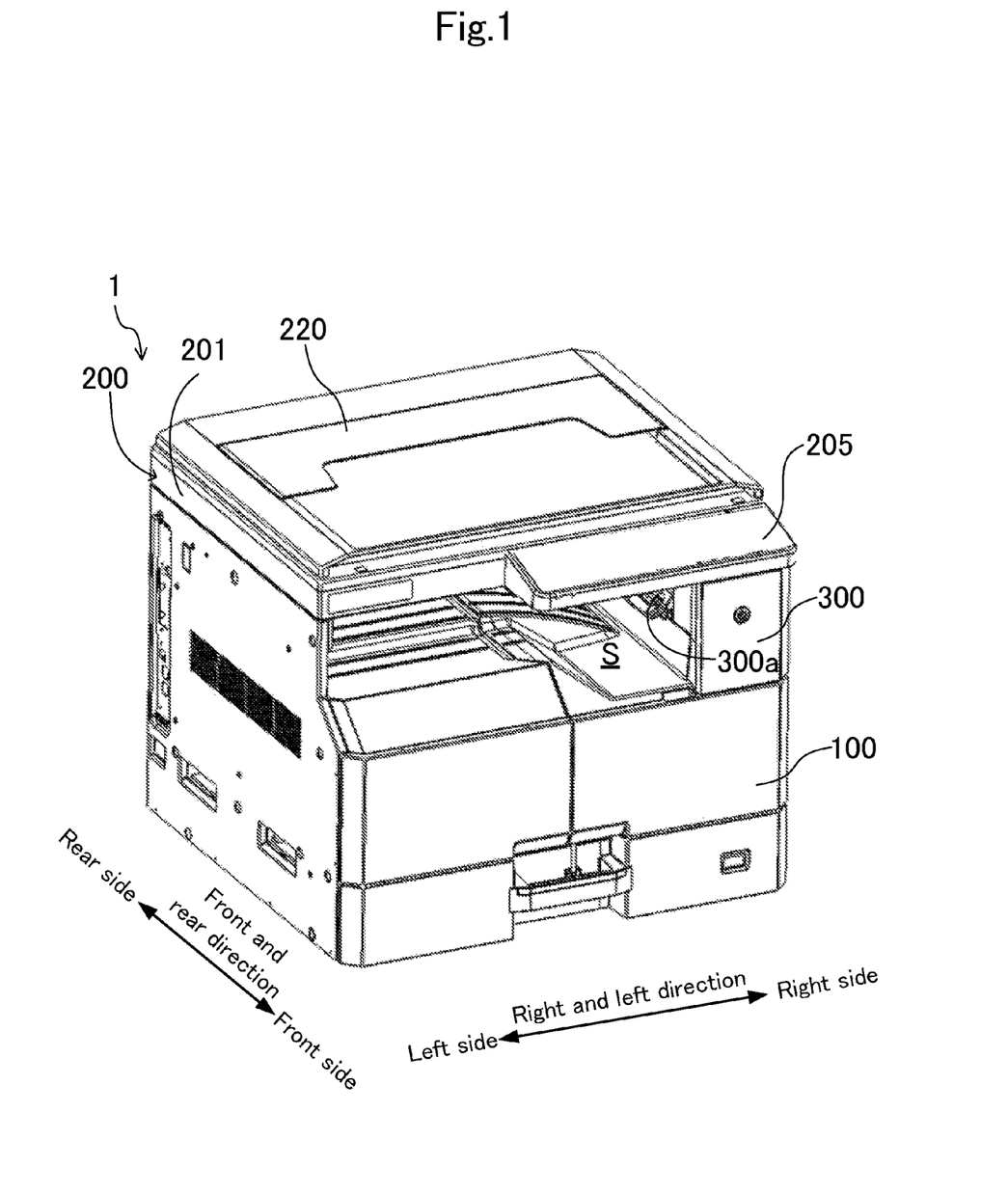
FIG. 1 is a perspective view of an image forming apparatus including an image reading device in an embodiment.
Figure 2:
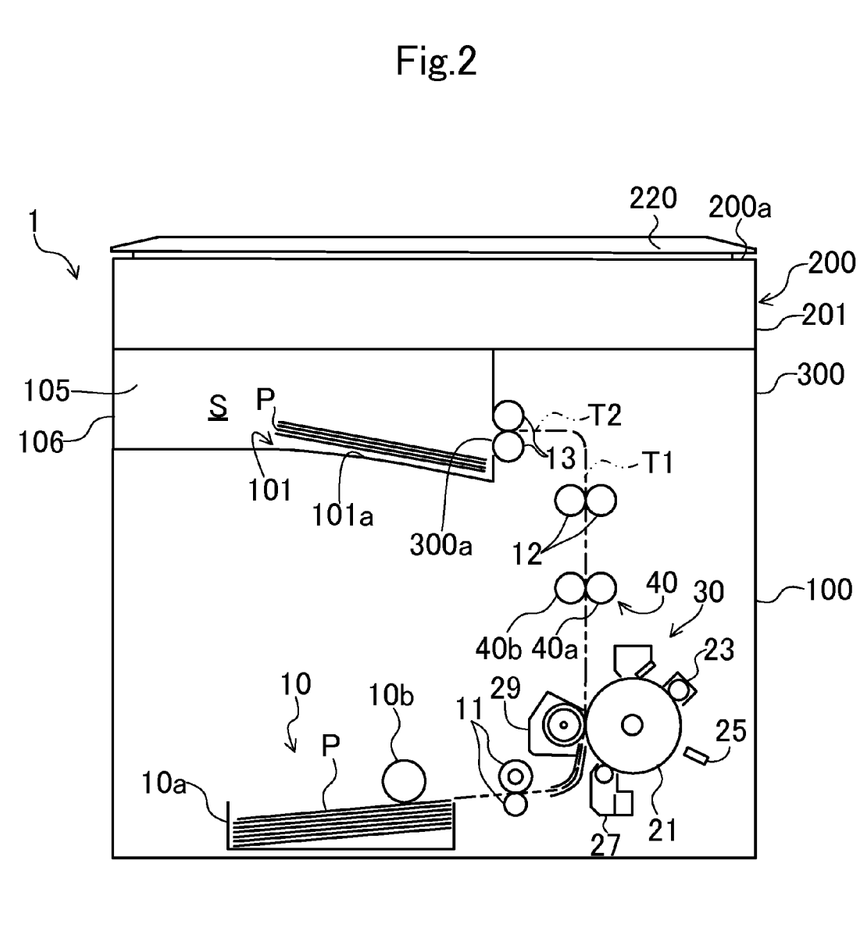
FIG. 2 is a schematic diagram illustrating a structure in an image forming apparatus body.

FIG. 1 and FIG. 2 illustrate an image forming apparatus 1 including an image reading device 200 of the present embodiment. The image forming apparatus 1 is a so-called in-body paper discharge type copy machine and has an image forming apparatus body 100, the image reading device 200, and a support housing 300. The image reading device 200 reads a document image and acquires image data thereof. The image forming apparatus body 100 has an image forming unit 30 for printing the image data acquired by the image reading device 200 on a paper P therein. The image reading device 200 is supported at an upper side of the image forming apparatus body 100 via the support housing 300. A paper discharge space S is formed between the image forming apparatus body 100 and the image reading device 200.

The aforementioned image reading device 200 has an approximately rectangular parallelepiped-shaped housing 201 for accommodating an image reading unit 210 therein. The housing 201 is provided at a lateral side thereof with an operation panel 205 used when a user performs various operation instructions with respect to the image forming apparatus 1 (see FIG. 1). In the following description, a side at which the operation panel 205 is positioned in the image forming apparatus 1 is defined as a "front side" and an opposite side thereof is defined as a "rear side". Furthermore, a left side when the image forming apparatus 1 is viewed from the front side is defined as a "left side" and a right side is defined as a "right side".

Figure 3:
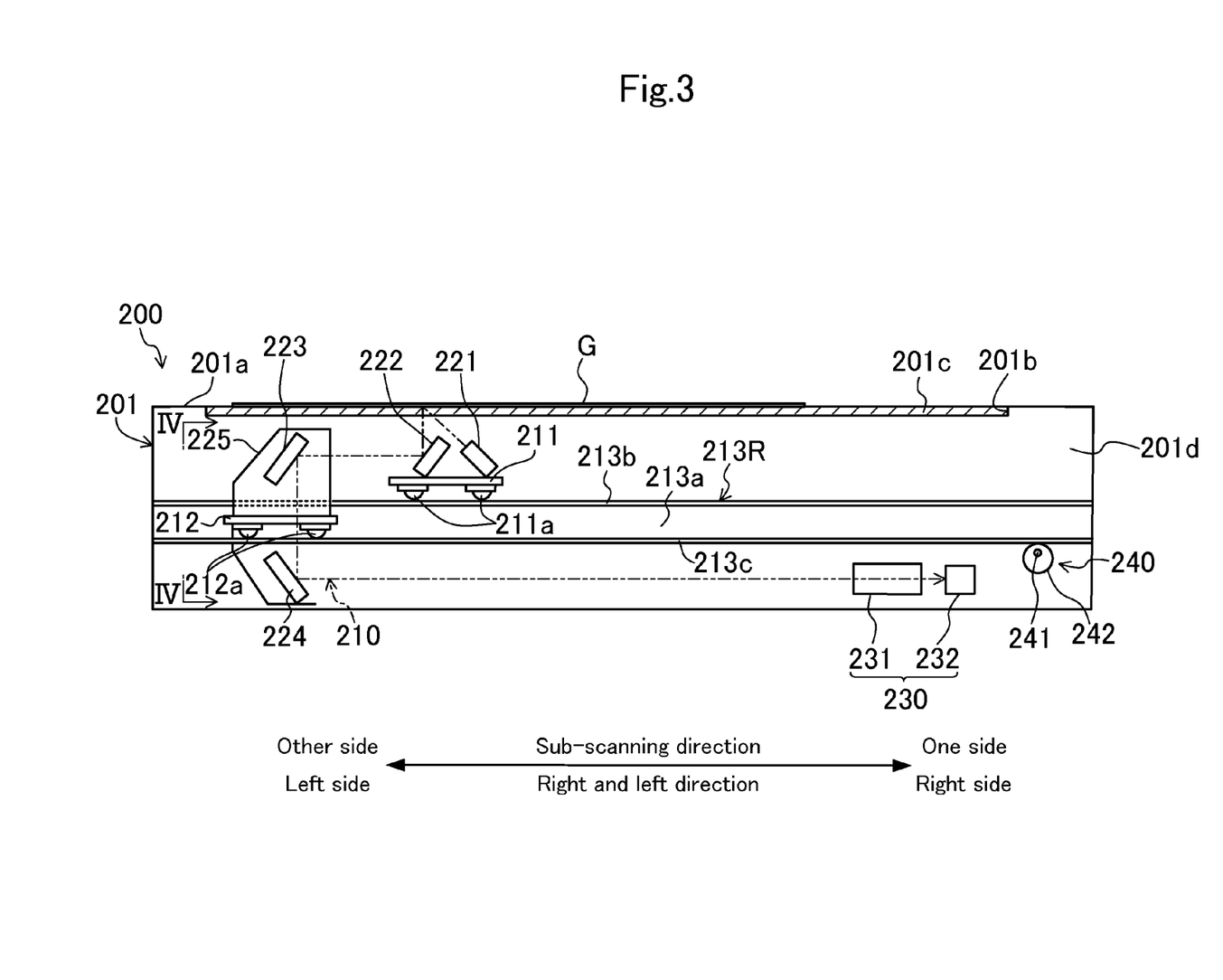
FIG. 3 illustrates an internal structure of an image reading device.

As illustrated in FIG. 3, an upper surface 201a of the aforementioned housing 201 is formed with an approximately rectangular opening 201b, and a contact glass (a document table glass) 201c is fitted into the opening 201b. A document cover 220 is supported at an end edge portion of the rear side of the upper surface 201a of the housing 201 so as to be freely openable and closable via a hinge part (not illustrated). In a close state, the document cover 220 presses a document G placed on the contact glass 201c from an upper side and fixes the document G.

The aforementioned image reading unit 210 is arranged at a rear surface side (an opposite side of a document placing surface side) of the contact glass 201c. The image reading unit 210 optically reads the document G placed on the contact glass 201c to generate image data thereof and stores the image data in a memory. Details of the image reading unit 210 will be described later.

The aforementioned image forming unit 30 is arranged near a right side wall portion at a lower portion of the image forming apparatus body 100. A paper feeding unit 10 is provided at a left side of the image forming unit 30 and a fixing unit 40 is provided above the image forming unit 30. The paper feeding unit 10 has a paper feeding cassette 10a in which a sheet-shaped paper P is accommodated, and a pick-up roller 10b for taking out the paper P in the paper feeding cassette 10a and sending the paper P to an exterior of the paper feeding cassette 10a. The paper P sent to the exterior of the cassette by the paper feeding cassette 10a is supplied to the image forming unit 30 via a conveying roller pair 11.

The image forming unit 30 has a photosensitive drum 21, a charging device 23, an exposure device 25, a developing device 27, and a transfer device 29.

In the fixing unit 40, the paper P is pressed between a fixing roller 40a and a pressing roller 40b, so that a toner image is thermally fixed to the paper P. Then, the paper P is led to the paper discharge space S by a conveying roller pair 12 and 13.

As illustrated in FIG. 3, the image reading device 200 includes the housing 201, the contact glass 201c mounted on the upper surface of the housing 201 and on which the document G is placed, a first carriage 211 provided below the contact glass 201c, a second carriage 212 provided at a left side of the first carriage 211, and a photoelectric conversion unit 230 provided at a right side of the second carriage 212.

The first carriage 211 and the second carriage 212 are supported by a pair of rail members 213F and 213R (FIG. 3 illustrates only one rail member 213R) so as to be movable in the right and left direction (a sub-scanning direction perpendicular to a main scanning direction). The first carriage 211 and the second carriage 212 have spherical abutting portions 211a and 212a making point-contact with the rail members 213F and 213R, respectively. Details of support structures of the carriages 211 and 212 by the pair of rail members 213F and 213R will be described later. The first carriage 211 and the second carriage 212 are connected to driving mechanisms (not illustrated), respectively. At the time of image reading by the image reading device 200, the driving mechanisms drive the carriages 211 and 212 along the pair of rail members 213F and 213R in the sub-scanning direction. The aforementioned driving mechanism, for example, is configured with an endless toothed rotating belt and a movable pulley engaging with a tooth part of an inner peripheral surface of the rotating belt.

The aforementioned first carriage 211 holds a light source 221 and a first reflective mirror 222. The first carriage 211 is accommodated in the housing 201 together with the light source 221. The light source 221 irradiates line-shaped illumination light extending in the main scanning direction (a direction vertical to the paper plane of FIG. 3) toward the document G on the contact glass 201c. The light source 221 is configured by a line light source having a plurality of light emitting elements arranged in the main scanning direction. It is noted that the light source 221 may also be a diffusion type point light source that irradiates light spreading in a line shape in the main scanning direction. The first reflective mirror 222 reflects reflected light from the document G toward the second carriage 212. The first reflective mirror 222 is inclined with respect to a vertical direction by 45°.

The aforementioned second carriage 212 holds a second reflective mirror 223 and a third reflective mirror 224. The second reflective mirror 223 is arranged to face the first carriage 211 in a horizontal direction. The second reflective mirror 223 is inclined with respect to the vertical direction by 45° in the same direction as that of the first reflective mirror 222. The third reflective mirror 224 is arranged below the second reflective mirror 223. The third reflective mirror 224 is inclined with respect to the vertical direction by 45° in a direction opposite to that of the second reflective mirror 223.

The light reflected from the first reflective mirror 222 of the aforementioned first carriage 211 progresses in the horizontal direction and reaches the second reflective mirror 223, the light reflected from the second reflective mirror 223 progresses downward and reaches the third reflective mirror 224, and the light reflected from the third reflective mirror 224 progresses in the horizontal direction and is lead to the photoelectric conversion unit 230.

The photoelectric conversion unit 230 includes an image forming lens 231 and an image sensor 232 arranged at a right side of the image forming lens 231, and is fixed to a bottom wall of the housing 201. The image forming lens 231 forms an image of the reflected light of the document G, which has been incident via the third reflective mirror 224, on the image sensor 232. The image sensor 232 has imaging elements such as CCDs arranged in the main scanning direction. The image sensor 232 converts an optical image of the document G formed by the image forming lens 231 into an electrical signal.

When the image of the document G on the contact glass 201c is read by the image reading device 200, the document G is illuminated by the light source 221 held by the first carriage 211, and the first carriage 211 is moved by a driving mechanism (not illustrated) from a preset initial position at a predetermined speed in a right direction (the sub-scanning direction). Furthermore, with the movement of the first carriage 211, the second reflective mirror 223 is moved at a speed corresponding to ½ of the speed of the first carriage 211 by a driving mechanism (not illustrated) in the right direction (the sub-scanning direction). As a consequence, in each movement position of the sub-scanning direction, the reflected light from the document G due to the illumination light of the light source 221 of the first carriage 211 is sequentially reflected by the first reflective mirror 222, the second reflective mirror 223, and the third reflective mirror 224, and is led to the photoelectric conversion unit 230 with a constant optical path length. In the photoelectric conversion unit 230, image data is generated in each position of the sub-scanning direction of the document G and is transmitted to an image processing circuit (not illustrated). The image processing circuit synthesizes the image data from the photoelectric conversion unit 230 to generate image data of an entire document.

Figure 4:
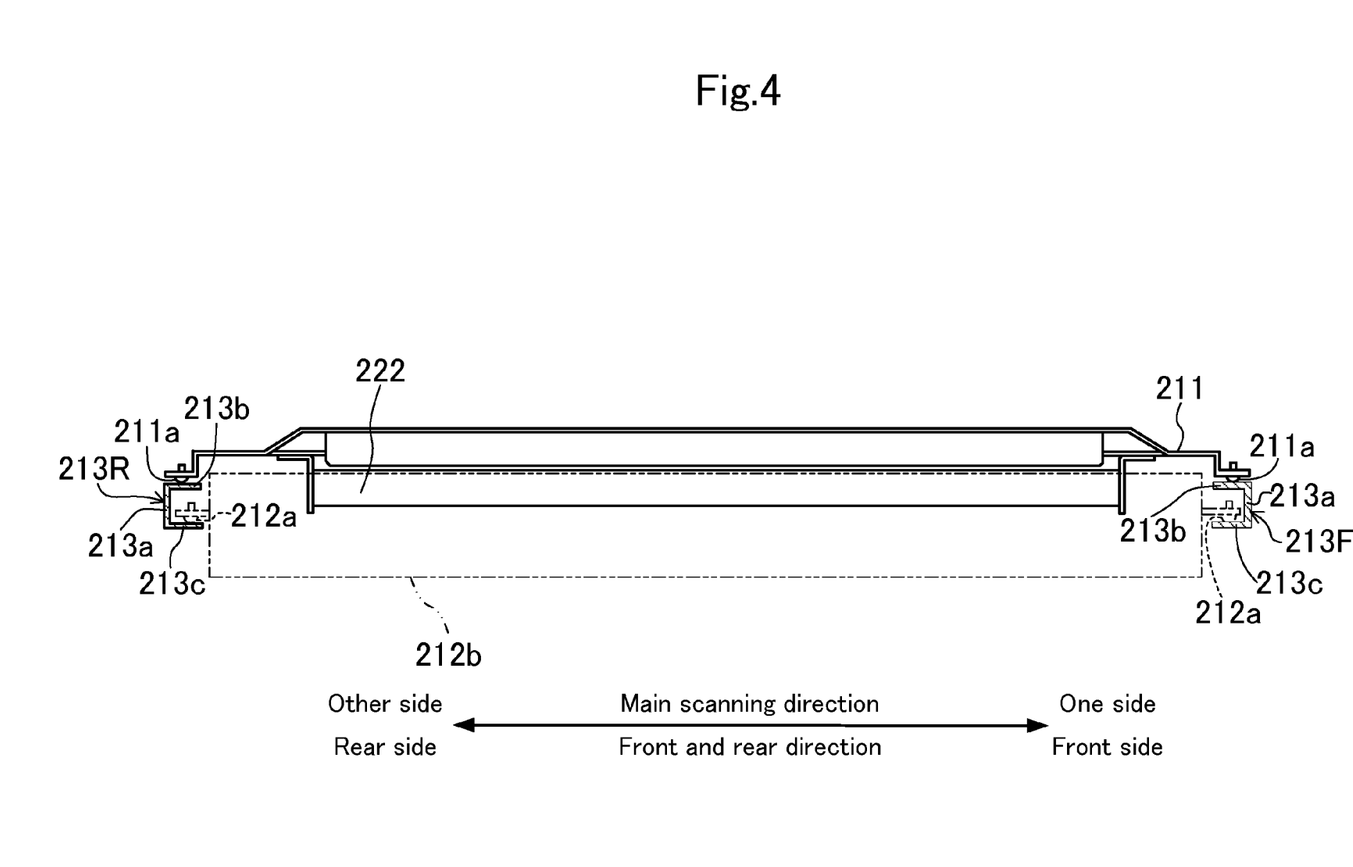
FIG. 4 is a sectional view taken along line IV-IV of FIG. 3.

Next, with reference to FIG. 4, the support structures of the first and second carriages 211 and 212 by the pair of rail members 213F and 213R will be described. The pair of rail members 213F and 213R are arranged spaced apart from each other in the main scanning direction. The section of each of the rail members 213F and 213R vertical to the sub-scanning direction has a C shape opened inward. That is, each of the rail members 213F and 213R has a vertical plate 213a, an upper side horizontal plate 213b connected to an upper end portion of the vertical plate 213a, and a lower side horizontal plate 213c connected to a lower end portion of the vertical plate 213a. The first carriage 211 abuts the upper side horizontal plates 213b of the rail members 213F and 213R via the abutting portions 211a and is supported by the upper side horizontal plates 213b. The second carriage 212 abuts the lower side horizontal plates 213c of the rail members 213F and 213R via the abutting portions 212a and is supported by the lower side horizontal plates 213c.

Figure 5:
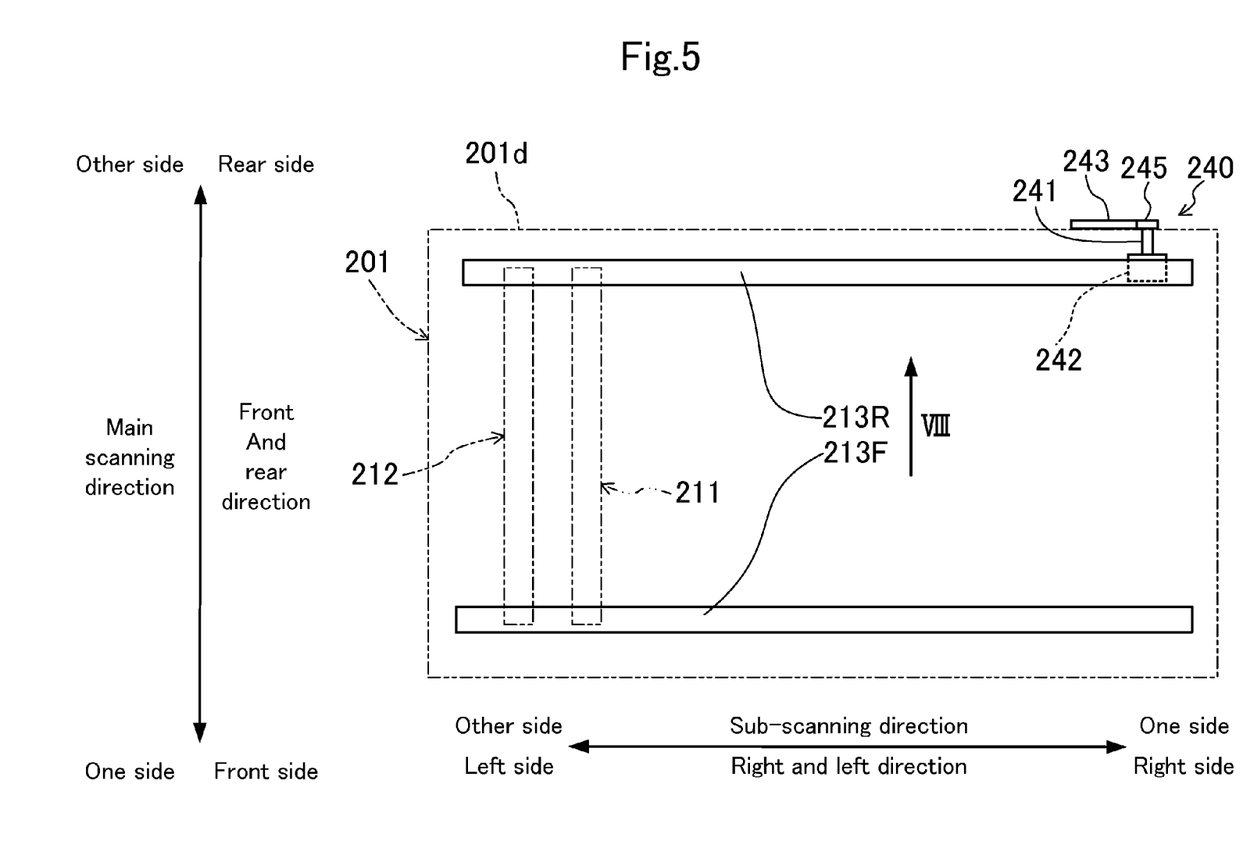
FIG. 5 is a schematic plan view of an image reading device when viewed from an upper side.
Figure 6:
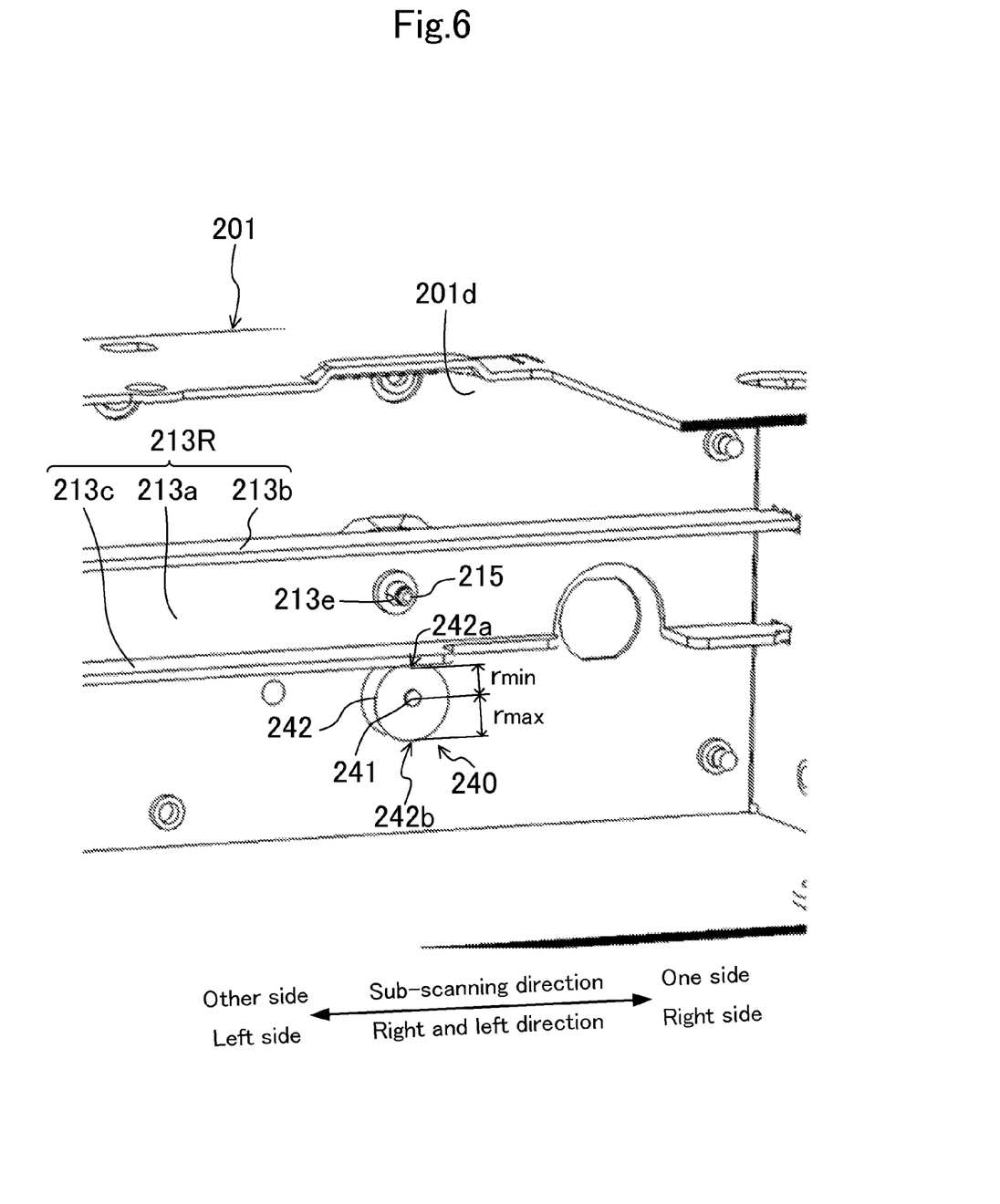
FIG. 6 is a perspective view of a position adjustment mechanism of a rail member viewed from an inner side of a housing.

As illustrated in FIG. 5, below one rail member 213R, a position adjustment mechanism 240 is provided to adjust parallelism for the other rail member 213F. The position adjustment mechanism 240 is arranged in the vicinity of one side end portion of the rail member 213R in the sub-scanning direction when viewed from the upper side. The position adjustment mechanism 240 has a shaft 241, an eccentric cam 242, and a handle 243 serving as an operation unit. The shaft 241 is arranged below the rail member 213R and extends in the main scanning direction. The shaft 241 passes through a side wall 201d of the housing 201. The side wall 201d is formed with a through hole (not illustrated) through which the shaft 241 passes, and the through hole serves as a bearing hole that supports the shaft 241 so as to be rotatable. The eccentric cam 242 is formed in a disc shape and is fixed to one side end portion of the shaft 241. The eccentric cam 242 is eccentrically arranged with respect to the shaft 241 when viewed from an axial direction. That is, the eccentric cam 242 has a minimum diameter part 242a having a minimum distance to a shaft line of the shaft 241 and a maximum diameter part 242b having a maximum distance to the shaft line. A peripheral surface of the eccentric cam 242 abuts one side end portion (a predetermined place) of the rail member 213R from below. The eccentric cam 242 rotates together with the shaft 241, thereby displacing one side end portion of the rail member 213 in the vertical direction.

Figure 7:
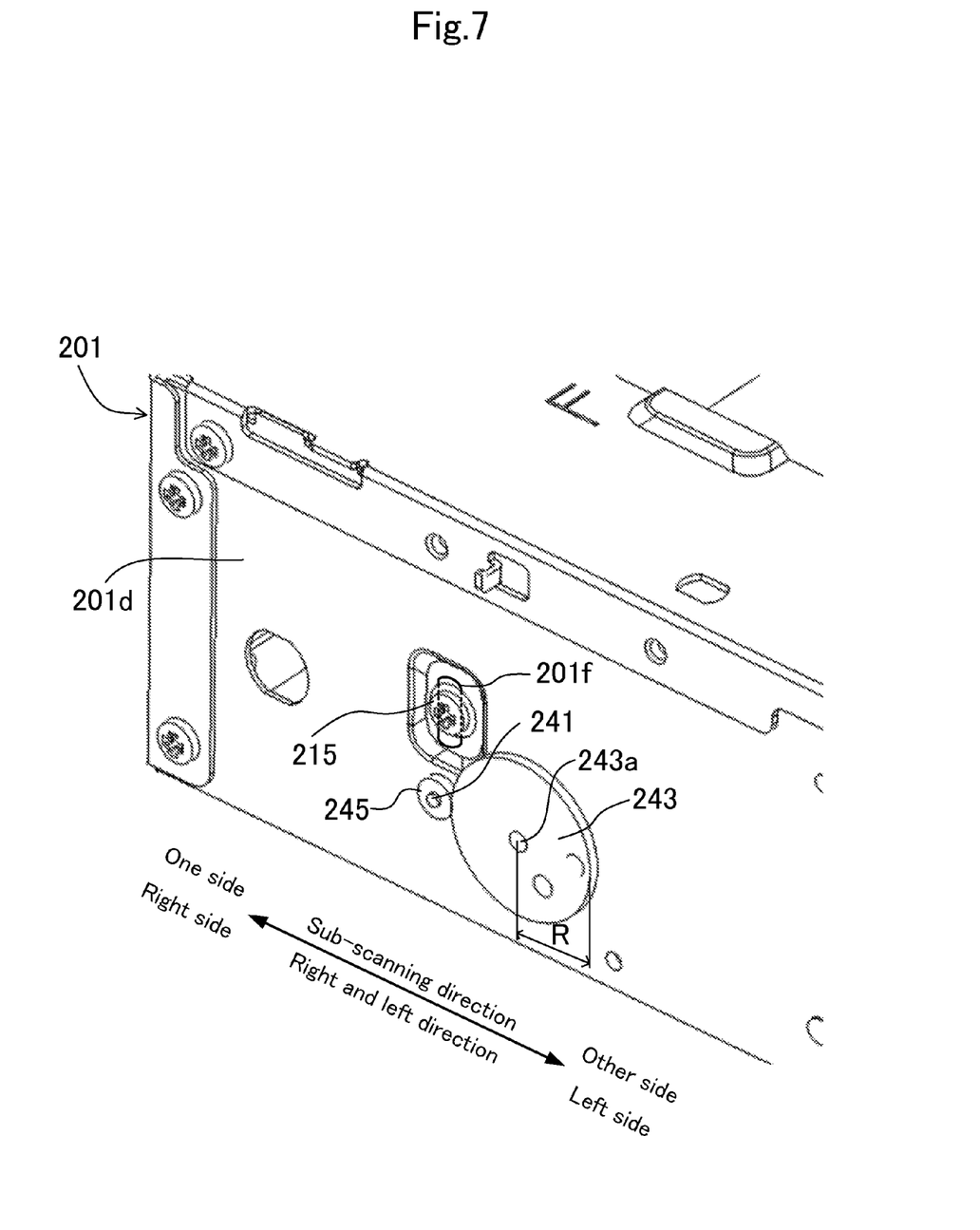
FIG. 7 is a perspective view of a position adjustment mechanism of a rail member viewed from an outer side of a housing.

The other end side of the shaft 241 protrudes to an exterior of the housing 201 as illustrated in FIG. 7. The other side end portion (that is, the protruding portion) of the shaft 241 is connected to the handle 243 via a gear 245 (a gear mechanism). The handle 243 is formed in a disc shape and is rotatable together with a shaft 243a passing through the side wall 201d of the housing 201. A gear part is formed on an outer peripheral surface of the handle 243 across the whole circumference, and is engaged with the aforementioned gear 245. A diameter of the gear 245 is sufficiently smaller than that of the handle 243. When the handle 243 is rotated, the gear 245 connected to the shaft 241 is rotated, so that the shaft 241 is rotated together with the eccentric cam 242. A rotation radius R (that is, a radius R about the shaft line of the shaft 243a of the handle 243) of the handle 243 is larger than a maximum radius rmax (that is, a rotation radius about the aforementioned shaft line of the maximum diameter part 242b of the eccentric cam 242) of the eccentric cam 242.

Figure 8:
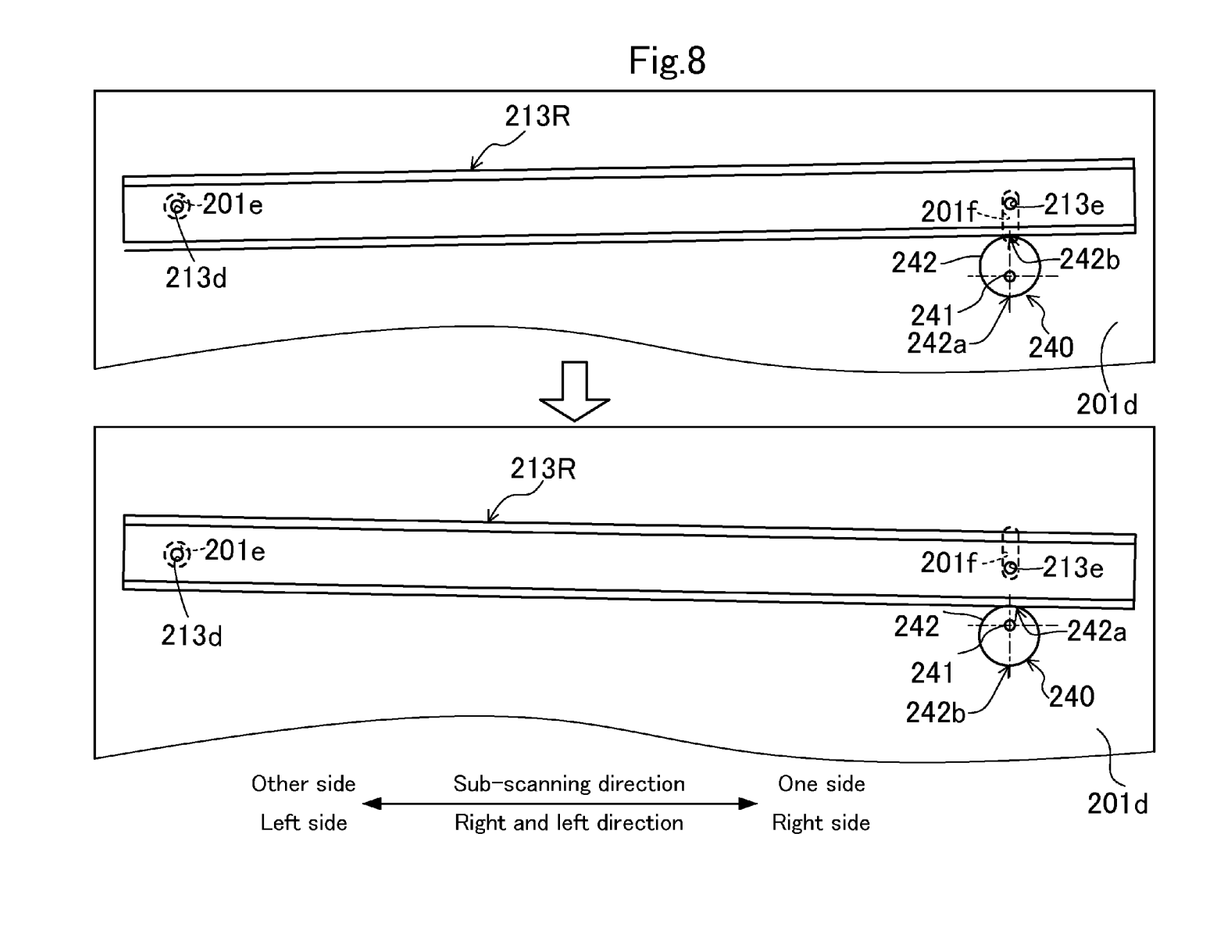
FIG. 8 is a view viewed in the arrow direction of VIII of FIG. 5, wherein an upper view illustrates a state in which a maximum diameter part of an eccentric cam abuts a rail member, and a lower view illustrates a state in which a minimum diameter part of the eccentric cam abuts the rail member.

As illustrated in FIG. 8, the aforementioned pair of rail members 213F and 213R are formed with a pair of fixing screw holes 213d and 213e, respectively. The pair of screw holes 213d and 213e are formed spaced apart from each other in the sub-scanning direction. At parts of the side wall 201d of the housing 201, which correspond to the pair of screw holes 213d and 213e, a pair of through holes 201e and 201f, into which screws 215 are inserted from the exterior of the housing 201, are formed. One through hole 201e is configured by a cylindrical hole coaxial with the screw hole 213d, but the other through hole 201f (of a side at which the adjustment mechanism 240 is positioned) is configured by a long hole long in the vertical direction. As described above, since the other through hole 201f is configured with a long hole, when a worker fixes the rail member 213R to the housing 201, it is possible to easily adjust the inclination of the rail member 213R in the vertical direction.

An upper view of FIG. 8 illustrates a state in which the maximum diameter part 242b of the eccentric cam 242 of the position adjustment mechanism 240 abuts the rail member 213R. In this state, the rail member 213R is inclined upward toward one side from the other side of the sub-scanning direction (from the left side to the right side). When the handle 243 is rotated from this state (see FIG. 7), a distance from the shaft line of the eccentric cam 242 to an abutting place between the eccentric cam 242 and the rail member 213R is gradually reduces, so that one side end portion of the rail member 213R is displaced downward. As illustrated in a lower view of FIG. 8, when the minimum diameter part 242a of the eccentric cam 242 abuts the rail member 213R, the rail member 213R is inclined downward toward one side from the other side of the sub-scanning direction.

As described above, in the image reading device 200 of the aforementioned embodiment, when the shaft 241 is rotated, the eccentric cam 242 is rotated together with the shaft 241, so that one side end portion of one rail member 213R abutting the peripheral surface of the eccentric cam 242 is displaced in the vertical direction. Consequently, a user adjusts a rotation angle of the shaft 241 to adjust a displacement amount of one side end portion of one rail member 213R in the vertical direction, so that it is possible to easily adjust mutual parallelism (that is, a relative positional relation in a height direction) of the pair of rail members 213F and 213R. Accordingly, the first and second carriages 211 and 212 are inclined in the sub-scanning direction during movement, so that it is possible to prevent image distortion from occurring in a read image.

Furthermore, in the aforementioned embodiment, the other side end portion of the shaft 241 protrudes to the exterior of the housing 201, and the handle 243 is connected to the other side end portion of the shaft 241 via the gear 245.

According to the configuration, a user can operate the handle 243 from the exterior of the housing 201, thereby easily rotating the eccentric cam 242. Consequently, when the inclination of the rail member 213 is adjusted, since a user does not need to disassemble the image reading device 200 and puts his/her hands into the housing 201, it is possible to easily perform the adjustment work.

Furthermore, in the aforementioned embodiment, the rotation radius R of the aforementioned handle 243 is set to be larger than the maximum radius rmax of the aforementioned eccentric cam 242. Consequently, a user can apply large operating torque to the eccentric cam 242 with slight force. Thus, it is possible to easily rotate the eccentric cam 242 against reaction force from the rail member 213R. Accordingly, it is possible to more easily adjust a relative position (parallelism in the aforementioned embodiment) of the pair of rail members 213F and 213R in the height direction.

Furthermore, in the aforementioned embodiment, the image reading device 200 includes the gear 245 (a gear mechanism) interposed between the other side end portion of the shaft 241 and the handle 243, wherein the other side end portion of the shaft 241 is connected to the handle 243 via the gear 245.

According to the configuration, as compared with the case in which the handle 243 is directly connected to the shaft 241, since the degree of freedom of arrangement of the handle 243 increases, it is possible to arrange the handle 243 at a position at which the handle 243 is easily operated by a user. Furthermore, a gear ratio between the gear 245 and a gear part formed on the outer peripheral surface of the handle 243 is adjusted, so that it is possible to easily adjust a ratio of a rotation amount of the eccentric cam 242 with respect to a rotation amount of the handle 243.

Furthermore, for example, the degree of distortion of a printed image may also be automatically detected by an image sensor, and the shaft 241 and the eccentric cam 242 may also be automatically rotated based on the detected degree of distortion such that the rail members 213F and 213R are straightened. It is sufficient if an electric motor, for example, is used as an actuator for rotating the shaft 241 and the eccentric cam 242. In more detail, a printed image of a document printed by the image forming apparatus 1 is read by the image reading device 200 and the degree of distortion of the read printed image is calculated by a controller (not illustrated). In order to solve the distortion of the aforementioned image, the controller (a driving control unit) rotates the aforementioned shaft 241 by an electric motor (a driving unit) by a predetermined amount in response to the aforementioned calculated degree of distortion of the printed image.

Furthermore, in the aforementioned embodiment, since the second carriage 212 that supports the second reflective mirror 223 and the third reflective mirror 224 is configured to be provided separately from the first carriage 211 that supports the first reflective mirror 222, movement speeds of the carriages 211 and 212 are allowed to be different from each other, so that it is possible to constantly maintain an optical path length from the document G to the photoelectric conversion unit 230.

Herein, when both the carriages 211 and 212 are configured to be respectively supported by separate rail members, it is necessary to respectively perform position adjustment with respect to the rail members that support the carriages 211 and 212. On the other hand, in the aforementioned configuration, since both the carriages 211 and 212 are supported by the same rail members 213F and 213R, it is not necessary to perform position adjustment of the rail members for each of the carriages 211 and 212. Thus, it is possible to reduce inconvenience when a user performs position adjustment of the rail members 213F and 213R.

Furthermore, according to the aforementioned image forming apparatus 1 including the aforementioned image reading device 200, good image printing with no image distortion is possible.

<<Other Embodiments>>

Figure 9:
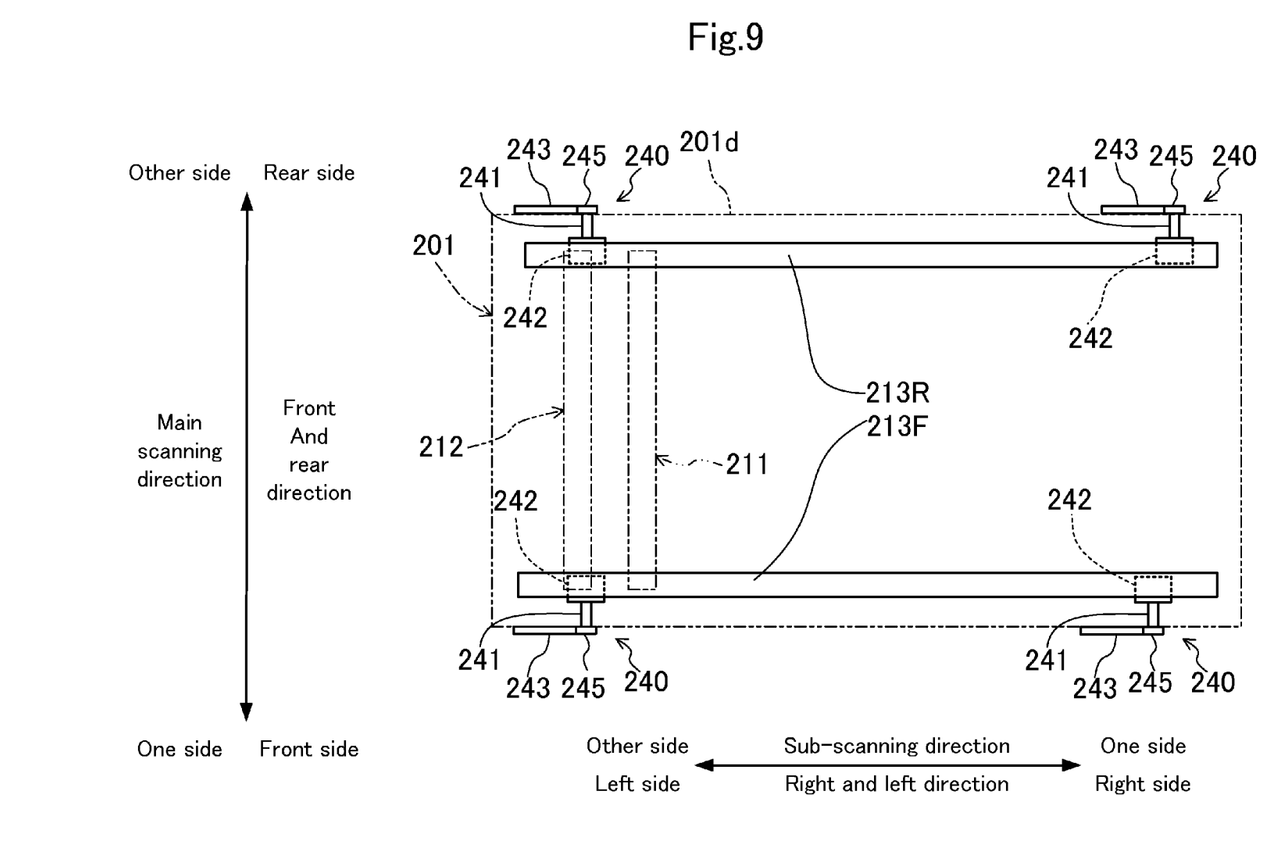
FIG. 9 is a view corresponding to FIG. 5, which illustrates an embodiment 2.

In the aforementioned embodiment, the position adjustment mechanism 240 is configured to be provided only at one side end portion of one rail member 213R; however, the present invention is not limited thereto. For example, as illustrated in FIG. 9, the position adjustment mechanism 240 may also be configured to be provided at both end portions of each of the rail members 213F and 213R one by one, that is, the total four position adjustment mechanisms 240 may also be provided. According to the configuration, it is preferable because it is possible to adjust not only the parallelism of the pair of rail members 213F and 213R but also the height of each of the pair of rail members 213F and 213R.

In the aforementioned embodiment, the handle 243 is connected to the shaft 241 via the gear 245; however, the present invention is not limited thereto. The handle 243 may also be directly connected to the shaft 241.

Furthermore, in the aforementioned embodiment, the light source 221 and the first reflective mirror 222 are configured to be held by the first carriage 211, and the second reflective mirror 223 and the third reflective mirror 224 are configured to be held by the second carriage 212; however, the present invention is not limited thereto. All the first carriage 211, the reflective mirrors 222 to 224, and the photoelectric conversion unit 230 may also be configured to be held by one first carriage 211.

What is claimed is:

1. An image reading device comprising:
a housing having a document table glass on an upper surface thereof;
a light source arranged below the document table glass in the housing and that irradiates light to a document on the document table glass;
a first carriage that holds the light source and a first reflective mirror that reflects reflected light from the document on the document table glass toward a predetermined direction, the first carriage being movable in a sub-scanning direction perpendicular to a main scanning direction;
a second carriage that holds a second reflective mirror and a third reflective mirror and is arranged so as to be movable in the sub-scanning direction, the second reflective mirror reflecting downward the reflected light from the first reflective mirror and the third reflective mirror arranged below the second reflective mirror to reflect the reflected light from the second reflective mirror toward the predetermined direction;
a photoelectric conversion unit that receives the reflected light reflected by third reflective mirror, and converts the received light into an electrical signal;
a pair of rail members that extend in the sub-scanning direction while being arranged spaced apart from each other in the main scanning direction and support the first carriage so as to be movable in the sub-scanning direction, a section of each of the rail members vertical to the sub-scanning direction having a C shape opening inward;
a rotatable shaft; and
an eccentric cam that is fixed to the shaft, has a peripheral surface abutting from below at least one predetermined place of the pair of rail members, and rotates together with the shaft to displace the predetermined place of the rail members in a vertical direction, wherein
each of the pair of rail members has a vertical plate, an upper side horizontal plate connected to an upper end portion of the vertical plate and a lower side horizontal plate connected to an lower end portion of the vertical plate;
the first carriage and the second carriage have spherical abutting portions making point-contact with the pair of rail members, respectively,
the first carriage abuts the upper side horizontal plates of the pair of rail members via the abutting portions and is supported by the upper side horizontal plates,
the second carriage abuts the lower side horizontal plates of the pair of rail members via the abutting portions and is supported by the lower side horizontal plates,
the rail members configured to displace in the vertical direction by the eccentric cam have a pair of screw holes spaced apart from each other in the sub-scanning direction,
at parts of a side wall of the housing, which correspond to the screw holes, through holes, into which screws are inserted from an exterior of the housing, are formed, and
one of the through holes is configured by a cylindrical hole coaxial with one of the screw holes, while another of the through holes is configured by a long hole long in the vertical direction.

2. The image reading device of claim 1, wherein
the housing accommodates the first carriage, the photoelectric conversion unit, and the pair of rail members therein,
the shaft passes through a side wall of the housing and has one side end portion fixed to the eccentric cam and a remaining side end portion protruding to the exterior of the housing, and
an operating unit for rotating the shaft together with the eccentric cam is connected to the remaining side end portion of the shaft.

3. The image reading device of claim 2, wherein a rotation radius of the operating unit is larger than a maximum radius of the eccentric cam.

4. The image reading device of claim 2, further comprising:
a gear mechanism interposed between the remaining side end portion of the shaft and the operating unit,
wherein the remaining side end portion of the shaft is connected to the operating unit via the gear mechanism.

5. An image forming apparatus comprising the image reading device of claim 1.

6. An image forming apparatus comprising:
the image reading device of claim 1;
a print unit that prints a document image read by the image reading device;
a detection unit that detects a degree of distortion of a printed image of the document printed by the print unit;
a driving unit that rotationally drives the shaft together with the eccentric cam; and
a driving control unit that rotates the shaft by the driving unit by a predetermined amount in response to the degree of distortion of the printed image detected by the detection unit.

* * * * *